(12) United States Patent
Lee et al.

(10) Patent No.: US 8,923,156 B1
(45) Date of Patent: *Dec. 30, 2014

(54) QUALITY OF SERVICE AWARE CHANNEL QUALITY INDICATOR

(71) Applicant: Marvell International Ltd., Hamilton (BM)

(72) Inventors: Jungwon Lee, San Diego, CA (US); Jihwan P. Choi, Daegu (KR); Yakun Sun, Sunnyvale, CA (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/014,869

(22) Filed: Aug. 30, 2013

Related U.S. Application Data

(63) Continuation of application No. 12/917,591, filed on Nov. 2, 2010, now Pat. No. 8,531,982.

(60) Provisional application No. 61/259,591, filed on Nov. 9, 2009.

(51) Int. Cl.
*H04W 24/00* (2009.01)
*H04W 24/08* (2009.01)

(52) U.S. Cl.
CPC .................................. *H04W 24/08* (2013.01)
USPC .......................................... 370/252; 370/329

(58) Field of Classification Search
CPC ................... H04W 72/1226; H04W 72/1231; H04W 72/1236; H04W 72/08; H04W 24/02; H04W 28/0231; H04W 28/0236; H04W 28/0252
USPC .......................................................... 370/329
See application file for complete search history.

(56) References Cited

U.S. PATENT DOCUMENTS

| | | | |
|---|---|---|---|
| 6,956,835 | B2 | 10/2005 | Tong et al. |
| 7,412,212 | B2 | 8/2008 | Hottinen |
| 8,175,181 | B1 | 5/2012 | Nabar et al. |
| 8,325,593 | B2 | 12/2012 | Kawamura et al. |
| 2006/0023745 | A1 | 2/2006 | Koo et al. |
| 2008/0020779 | A1* | 1/2008 | Ode et al. ........................ 455/450 |
| 2008/0320354 | A1 | 12/2008 | Doppler et al. |
| 2009/0209261 | A1* | 8/2009 | Kuri et al. ....................... 455/450 |
| 2009/0303900 | A1 | 12/2009 | Cho et al. |
| 2010/0329134 | A1 | 12/2010 | Doppler et al. |
| 2011/0096857 | A1 | 4/2011 | Koo et al. |
| 2011/0130098 | A1 | 6/2011 | Madan et al. |

* cited by examiner

*Primary Examiner* — Min Jung

(57) ABSTRACT

Systems, methods, and other embodiments associated with a quality of service (QoS) aware channel quality indicator (CQI) are described. In one embodiment, an apparatus includes determination logic configured to receive a request for a CQI. A QoS associated with a wireless channel on which to base the CQI is determined. The determination logic is further configured to compute the CQI based, at least in part, on the determined QoS.

20 Claims, 4 Drawing Sheets

QUALITY OF SERVICE AWARE CHANNEL QUALITY INDICATOR

CROSS REFERENCE TO RELATED APPLICATIONS

This disclosure is a continuation of U.S. application Ser. No. 12/917,591 filed on Nov. 2, 2010, now U.S. Pat. No. 8,531,982 which claims benefit under 35 USC §119(e) to U.S. provisional application Ser. No. 61/259,591 filed on Nov. 9, 2009, both of which are hereby wholly incorporated by reference.

BACKGROUND

Conventionally, a mobile station computes a channel quality indicator (CQI) without considering the quality of service (QoS) present and/or available on a wireless channel over which the mobile station and a base station (BS) communicate. When asked to calculate a CQI, a conventional mobile station may calculate one modulation and coding scheme (MCS) based on fixed assumptions that may not reflect actual or desired operating conditions.

QoS describes desired characteristics for a channel to deliver a specific type of traffic. Different channels may have different QoS and one channel may even offer different QoS at different times. While CQI refers to a measurement of the quality of a channel, QoS refers to desired requirements for communication on a channel. QoS can be described using parameters including, but not limited to, a maximum acceptable packet delay, a maximum acceptable packet error loss rate, a maximum acceptable block error rate at the first transmission, and so on. A pair of communicating devices may agree that the pair of communicating devices will strive to achieve the desired QoS.

Different types of traffic may request and/or require different QoS. For example, voice communications are tolerant to lost packets but susceptible to delayed packets. Humans can "fill in the gaps" in a voice conversation due to lost packets but become frustrated having to wait for unnatural delays in conversation. Thus, a voice communication channel (e.g., VoIP, voice over Internet Protocol) may have a QoS that specifies a relatively high maximum acceptable packet loss rate but a relatively low maximum acceptable packet delay. Data communications, on the other hand, are not very tolerant to lost packets but are tolerant to delayed packets. Computers can assemble packets when the packets arrive, but computers prefer to assemble correct packets with correct data. Thus, a data communication channel may have a QoS that specifies a relatively low maximum acceptable packet loss rate but a relatively high maximum acceptable packet delay.

Different apparatuses that conform with different standards may provide different built-in QoS definitions. For example, the 3GPP (third generation partnership project) defines nine different QoS definitions (QCI1 through QCI9, where QCI stands for QoS Class Identifier) with different packet delay budgets ranging from 50 ms to 300 ms and different packet error loss rates ranging from $10^{-2}$ to $10^{-6}$. Similarly, WiMAX defines five different QoS definitions (e.g., UGS, RT-VR, ERT-VR, NRT-VR, BE). Conventionally, a CQI measurement has been made without regard to the QoS in place or desired on the channel being evaluated. Instead, a conventional mobile station may make a CQI calculation based on channel conditions only, including, for example, path loss, and frequency selectivity and interference level with specific frequency reuse factor. Using these channel conditions, the mobile station may compute the CQI so that a fixed sized packet would have a 10% block error rate (BLER). While interesting and useful, this fixed assumption CQI may be somewhat irrelevant if the base station to which the fixed assumption CQI is provided is configured to provide a different QoS with a different BLER and packet size than those used by the mobile station in the CQI computation.

A CQI is a measurement of the quality of communication occurring on a wireless channel. A high CQI represents a channel with good quality, while a low CQI represents a channel with lower quality. A CQI can be computed a number of ways and may be based on items including, but not limited to, a signal to noise ratio (SNR), a signal to interference plus noise ratio (SINR), a signal to noise plus distortion ratio (SNDR), a finite alphabet capacity (FAC) calculation, a bit error rate (BER), and a block error rate (BLER). CQI messages are sent on a mobile communication system to provide a base station with information about the channel quality. A CQI message may carry information including, but not limited to, a carrier level received signal strength indication (RSSI), a bit error rate (BER), and a recommended transport-block size. The recommended transport-block size may be communicated rather than an objective measurement of signal quality because the qualities relevant to the channel are the maximum instantaneous data rate on the channel and the error rate associated with that data rate.

Conventional systems may include a base station that makes a CQI request to a mobile station. The mobile station may then compute a CQI using the mobile station's fixed assumptions and provide the CQI to the base station. The base station may then adapt scheduling and/or modulation based on the CQI. By way of illustration, a base station may schedule more traffic on a channel that has a higher CQI and less traffic on a channel that has a lower CQI. Also, a base station may change the base station's modulation scheme for a channel whose CQI falls below a threshold. While this conventional approach is useful, this conventional approach is based on an mobile station making a single CQI determination based on generally fixed assumptions at the mobile station. Thus, the single CQI determination may not be based on available and relevant information.

SUMMARY

In one embodiment, an apparatus includes a determination logic configured to receive a request for a CQI. A QoS associated with a wireless channel on which to base the CQI is determined. The determination logic is further configured to compute the CQI based, at least in part, on the determined QoS.

In one embodiment, a method includes receiving a request for a CQI. The method also includes determining a QoS associated with a wireless channel on which to base the CQI. The method further includes computing the CQI based, at least in part, on the determined QoS.

In one embodiment, a method includes observing traffic between a mobile station and a base station communicating on a wireless channel. The method also includes identifying a QoS associated with the observed traffic. The method further includes computing a CQI associated with the identified QoS.

BRIEF DESCRIPTION OF THE DRAWINGS

The accompanying drawings, which are incorporated in and constitute a part of the specification, illustrate various systems, methods, and other embodiments. It will be appreciated that the illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are example systems, methods, and apparatuses associated with computing a QoS-aware CQI. An example wireless communication apparatus (e.g., mobile station) may compute a CQI based on a QoS the wireless communication apparatus associates with observed traffic. Additionally, and/or alternatively, an example wireless communication apparatus may compute a CQI based on a QoS specified by another wireless communication apparatus (e.g., base station) that asked the mobile station to compute the CQI. From one point of view, the QoS-aware CQI can be seen as a data rate required on a channel to support target parameter (e.g., packet delay, packet loss) requirements for a QoS. From this point of view, the CQI can be expressed in terms of MCS or spectral efficiency (e.g., bits/sec/Hz). In one example, the base station may specify several QoS for which the mobile station is to compute a CQI. In one embodiment, a base station may reconfigure itself based on the QoS-aware CQI. For example, the base station may change base station downlink scheduling, resource block, MCS, transmission mode, beam forming (e.g., codebook, rank/layer selection), and so on. Having a base station reconfigure itself based on a QoS aware CQI facilitates maximizing throughput while satisfying QoS differentiation requirements. Having a base station reconfigure itself based on a QoS-aware CQI also facilitates reducing hybrid automatic repeat request (HARQ) retransmission, which in turn reduces end-to-end system latency.

The following includes definitions of selected terms employed herein. The definitions include various examples and/or forms of components that fall within the scope of a term and that may be used for implementation. The examples are not intended to be limiting. Both singular and plural forms of terms may be within the definitions.

Figure 1:
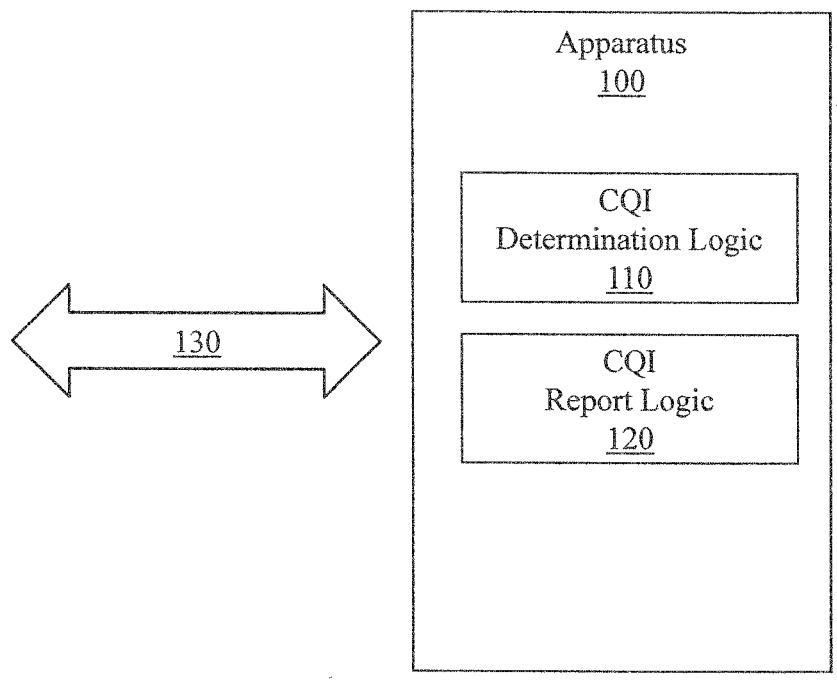
FIG. 1 illustrates one embodiment of an apparatus associated with QoS-aware CQI computation.

AMC adaptive modulation and coding
AP access point
BE best effort
BER bit error rate
BS base station
BLER block error rate
CQI channel quality indicator
DCH dedicated channel
DSCH downlink shared channel
eNodeB enhanced node base
ERT-VR extended real time variable rate
FAC finite alphabet capacity
FACH forward access channel
HARQ hybrid automatic repeat request
HHWA handheld wireless apparatus
HSDPA high speed downlink packet access
IEEE Institute of Electrical and Electronic Engineers
LTE long term evolution
MCS modulation and coding scheme
MS mobile station
NRT-VR non real time variable rate
QoS quality of service
RSSI received signal strength indicator
RT-VR real time variable rate
SIR signal to interference ratio
SNR signal to noise ratio
SNDR signal to noise plus distortion ratio
UE user equipment
UGS unsolicited grant service
VoIP voice over internet protocol
3GPP third generation partnership project FIG. 1 illustrates an apparatus 100 associated with QoS-aware CQI computation. Apparatus 100 includes CQI determination logic 110 and CQI report logic 120. Apparatus 100 receives CQI request messages and provides CQI report messages via a wireless channel 130.

In one embodiment, CQI determination logic 110 is configured to compute a quality of service (QoS) aware CQI as a function of a QoS associated with wireless channel 130. Wireless channel 130 may be a channel over which a first wireless communication apparatus and a second wireless communication apparatus communicate. The first wireless communication apparatus and the second wireless communication apparatus may communicate according to protocols including, but not limited to, 3GPP LTE, IEEE 802.16 WiMax, and IEEE 802.11 WiFi. Thus, the first wireless communication apparatus and the second wireless communication apparatus may be referred to as a BS/MS pair, an eNodeB/UE pair, an AP/client device pair, and in other ways. In one example, apparatus 100 is a mobile station.

In one embodiment, CQI report logic 120 is configured to report the QoS-aware CQI in a CQI report message. The CQI report message may be provided to a wireless communication apparatus that requested the QoS-aware CQI in a CQI request message. The CQI report logic 120 may report the CQI in a variety of ways. In one example, the CQI report logic 120 is configured to report the QoS-aware CQI as a modulation coding scheme (MCS) in the CQI report message.

The CQI determination logic 110 can compute the CQI in different ways. In different embodiments the CQI determination logic 110 is configured to compute the QoS-aware CQI as a function of data including one or more of a signal to noise ratio (SNR) associated with the wireless channel 130, a signal to interference plus noise ratio (SINR) associated with the wireless channel 130, a signal to noise plus distortion ratio (SNDR) associated with the wireless channel 130, a path loss measurement, and a frequency selectivity and interference level. The CQI determination logic 110 can consider additional and/or alternative data. The CQI determination logic 110 can also compute the CQI using different approaches to processing the available information (e.g., SNR). In one embodiment, the CQI determination logic 110 is configured to compute the QoS-aware CQI using a finite alphabet capacity (FAC) block error rate (BLER) approach.

The CQI request can take different forms and thus the CQI determination logic 110 may respond in different ways. In one example, the CQI request asks the apparatus 100 to provide one CQI based on one type of traffic observed on wireless channel 130. In this example, the CQI determination logic 110 computes the CQI based on a QoS associated with a single type of traffic observed on the wireless channel.

In another example, the CQI request asks the apparatus 100 to provide one CQI based on multiple types of traffic observed on wireless channel 130. In this example, the CQI determination logic 110 is configured to compute multiple candidate CQIs using QoS parameters associated with multiple QoSs that are associated with the multiple types of observed traffic. Since the CQI request asks for a single CQI, the CQI determination logic 110 is configured to select the QoS-aware CQI from the candidate CQIs so that one or more communication objectives are optimized. The QoS parameters can include, but are not limited to, packet delay, packet error loss, and block error rate at first transmission. The communication objectives may include, but are not limited to, spectral efficiency on the wireless channel, end-to-end latency between the first wireless communication apparatus and the second wireless communication apparatus, and throughput on the wireless channel. In one example, the CQI determination logic 110 selects the CQI associated with the most stringent QoS. In other embodiments, the CQI determination logic 110 may select the most stringent QoS, the least stringent QoS, the average of the two or more QoS, and so on.

In one example, the apparatus 100 receives a QoS associated with the wireless channel 130 in the CQI request message. In this example, the CQI determination logic 110 computes the CQI as a function of that received QoS.

In another example, the apparatus 100 receives a plurality of QoS associated with the wireless channel 130 in the CQI request message. In this example, the CQI determination logic 110 is configured to compute a plurality of QoS-aware CQI corresponding to the plurality of QoS. In one example, one CQI is computed for each QoS. Since the CQI determination logic 110 may compute multiple CQI, the CQI report logic 120 may be configured to provide the plurality of QoS-aware CQI in the CQI report message.

Thus, to summarize, in one embodiment, the CQI determination logic 110 may be configured to perform one or more of: determining the QoS associated with the wireless channel 130 by observing a single type of traffic between the first wireless communication apparatus and the second wireless communication apparatus on the wireless channel; determining the QoS associated with the wireless channel 130 by identifying two or more QoS associated with two or more types of traffic observed on the wireless channel 130 and selecting a member of the two or more QoS that is the most stringent of the two or more QoS; determining the QoS-aware CQI as a function of a single QoS provided in the CQI request message; and determining a plurality of QoS-aware CQI as a function of a plurality of QoS provided in the CQI request message.

Figure 2:
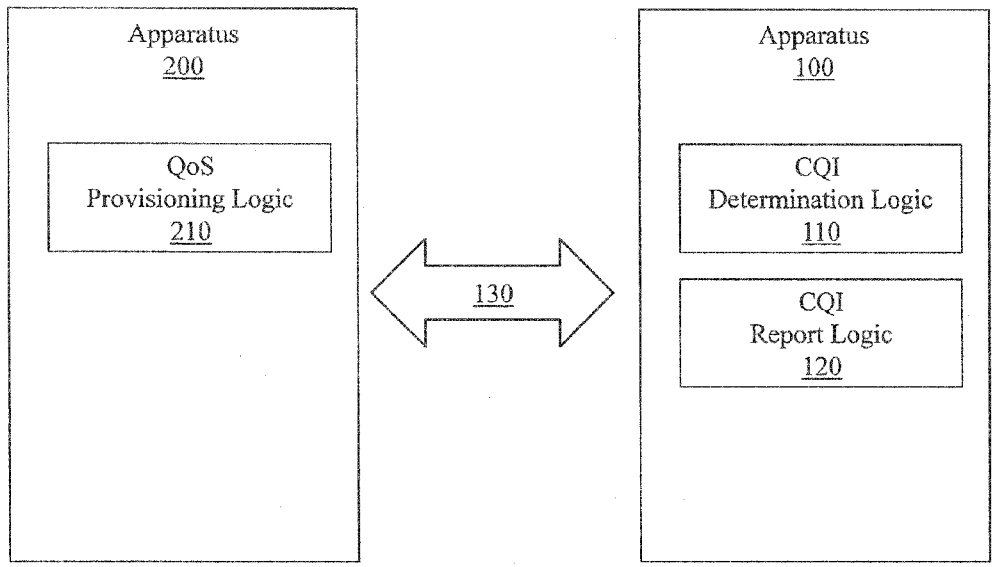
FIG. 2 illustrates one embodiment of a system associated with QoS-aware CQI computation.

FIG. 2 illustrates a system 200 that includes apparatus 100 and apparatus 200. Apparatus 100 includes a CQI determination logic 110 and a CQI report logic 120. Apparatus 200 includes a QoS provisioning logic 210. Apparatus 100 and apparatus 200 communicate via wireless channel 130.

In one example, the CQI determination logic 110 is configured to control the QoS provisioning logic 210 by providing the QoS-aware CQI. The QoS provisioning logic 210 can be controlled to perform actions including, but not limited to, QoS provisioning for an uplink between apparatus 100 and the apparatus 200, QoS provisioning for a downlink between apparatus 100 and apparatus 200, QoS provisioning for a peer-to-peer communication between apparatus 100 and apparatus 200, scheduling in apparatus 100, scheduling in apparatus 200, resource block allocation in apparatus 100, resource block allocation in apparatus 200, a transmission mode in apparatus 100, a transmission mode in apparatus 200, beam forming in apparatus 100, and beam forming in apparatus 200.

From one point of view, FIG. 2 can be viewed as illustrating a mobile station (MS) 100 configured to provide a QoS-aware CQI computed as a function of one or more of, a QoS determined by mobile station 100, and a QoS provided to mobile station 100 by base station 200, and a base station 200 configured to control QoS-provisioning based on the QoS-aware CQI provided by the mobile station 100. While BS/MS terminology is employed, a QoS-aware CQI can be requested, computed, and provided in different environments and thus more generally FIG. 2 illustrates an apparatus 100 and an apparatus 200.

Figure 3:
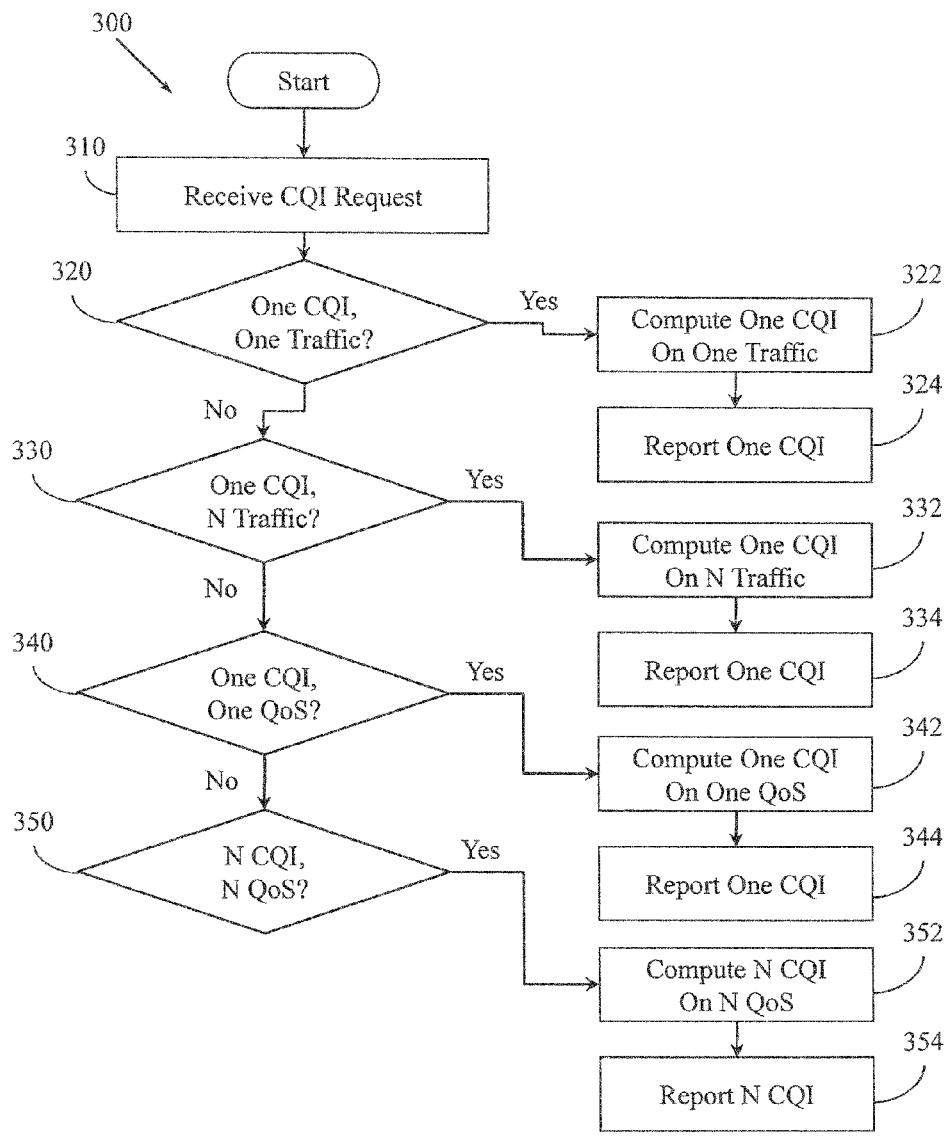
FIG. 3 illustrates one embodiment of a method associated with QoS-aware CQI computation.

FIG. 3 illustrates a method 300 associated with QoS-aware CQI computation. At 310, method 300 includes receiving, in an mobile station, a CQI request from a base station. The CQI request may request different things. For example, the CQI request may ask the mobile station to provide a single CQI based on a single QoS that the mobile station identifies as being associated with traffic observed on a wireless channel between the base station and the mobile station. The CQI request may also ask the mobile station to provide a single CQI selected from multiple CQI computed based on multiple QoS associated with multiple types of traffic observed on the wireless channel. The CQI request may also ask the mobile station to provide a single CQI based on an explicit QoS provided by the base station or to provide multiple CQI based on multiple explicit QoS provided by the base station.

Therefore, at 320, a determination is made concerning whether the CQI request seeks (i) a single CQI computed by the mobile station, (ii) that the CQI request does not specify a QoS, and (iii) that the mobile station is to base the single CQI on a single observed traffic type. If the determination at 320 is yes, then at 322 a current QoS associated with the single observed traffic type is identified and a QoS-aware CQI is computed based on the current QoS. At 324 the QoS-aware CQI is reported to the base station. The QoS-aware CQI may be reported in a CQI report message.

At 330, a determination is made concerning whether the CQI request seeks (i) a single CQI computed by the mobile station, (ii) that the CQI request does not specify a QoS, and (iii) that the mobile station is to base the single CQI on two or more observed traffic types. If the determination at 330 is yes, then at 332 two or more current QoS associated with the two or more observed traffic types are identified and two or more QoS-aware CQI are computed based on the two or more current QoS. Since the base station asked for just one CQI, computing the one CQI at 332 also includes selecting a QoS-aware CQI from the two or more QoS-aware CQI. The selected QoS is selected to satisfy a selection criterion. The selection criterion may be designed, for example, to select the most stringent QoS, to select the least stringent QoS, to select the average QoS, and so on. At 334, the selected QoS-aware CQI is provided to the base station.

At 340, a determination is made concerning whether the CQI request seeks a single CQI computed by the mobile station in response to a single explicit QoS specified by the base station. If the determination at 340 is yes, then at 342, a QoS-aware CQI based on the single explicit QoS specified by the base station is computed. At 344, the single QoS-aware CQI is provided to the base station.

At 350, a determination is made concerning whether the CQI request seeks multiple CQIs computed by the mobile station in response to multiple explicit QoS specified by the base station. If the determination at 350 is yes, then at 352, multiple CQI corresponding to the multiple explicit QoS specified by the base station are computed. At 354, the multiple CQI are provided to the base station in a CQI report.

Computing a CQI at 322, 332, 342, and/or 352 can be performed in different ways. In one example, computing a QoS-aware CQI involves computing a finite alphabet capacity (FAC) based on QoS constraints and the effects of hybrid automatic repeat request (HARQ) retransmission.

Figure 4:
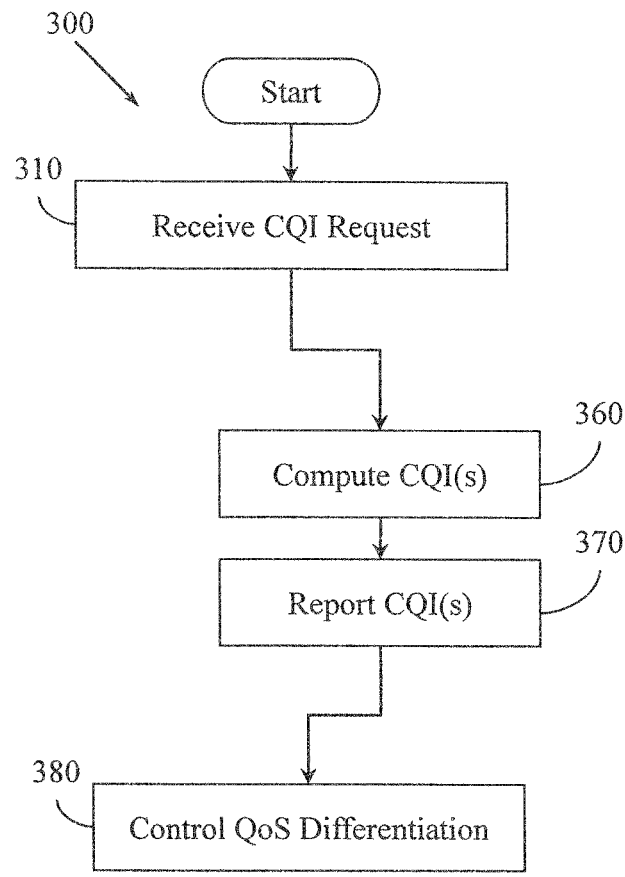
FIG. 4 illustrates one embodiment of a method associated with QoS-aware CQI computation.

FIG. 4 illustrates another embodiment of method 300. This embodiment generalizes the processing described for 320 through 354 as computing a CQI(s) at 360 and reporting a CQI(s) at 370. This embodiment of method 300 also includes, at 380, controlling QoS differentiation. When a base station provides a CQI request to an mobile station, and the mobile station provides a QoS-aware CQI, the QoS-aware CQI can be used to control the base station to selectively provision QoS differentiation as a function of a QoS-aware CQI received from the mobile station. While controlling the base station is described, the method can be applied more generally. For example, a receiver of the QoS-aware CQI can base actions on the QoS-aware CQI. In different embodiments, the receiver can take actions including, but not limited to, QoS provisioning for an uplink between two apparatuses, QoS provisioning for a downlink between two apparatuses, QoS provisioning for a peer-to-peer communication between two apparatuses, scheduling in an apparatus, resource block allocation in an apparatus, updating a transmission mode in an apparatus, and beam forming in an apparatus.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes computer or electrical hardware, firmware, a non-transitory computer readable medium with stored instructions, and/or combinations of each to perform a function(s) or an action(s), and/or to cause a function or action from another logic, method, and/or system. Logic may include a microprocessor programmed with an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements. Logic is limited to statutory subject matter under 35 U.S.C. §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described and claimed are limited to statutory subject matter under 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   a non-transitory computer medium storing a determination logic, wherein the determination logic is configured to:
      receive a request for a channel quality indicator (CQI);
      identify two or more QoSs associated with two or more types of traffic observed on a wireless channel;
      select a member of the two or more QoSs that is the most stringent of the two or more QoSs; and
      compute the CQI based, at least in part, on the selected QoS.

2. The apparatus of claim 1, wherein a first wireless device and a second wireless device communicate over the wireless channel.

3. The apparatus of claim 1, wherein the determination logic is configured to:
   compute a plurality of candidate CQIs; and
   select a CQI from the candidate CQIs.

4. The apparatus of claim 1, wherein the determination logic is configured to compute the CQI based, at least in part, on a QoS provided in the request.

5. The apparatus of claim 1, wherein the determination logic is further configured to report the computed CQI to a wireless device on the wireless channel.

6. The apparatus of claim 1, wherein the determination logic is configured to control, based on the computed CQI, a provisioning logic to perform provisioning.

7. An apparatus comprising:
   a non-transitory computer medium storing a determination logic, wherein the determination logic is configured to:
      receive a request for a channel quality indicator (CQI);
      determine a quality of service (QoS) associated with a wireless channel on which to base the CQI, wherein the QoS is determined by observing a single type of traffic on the wireless channel; and
      compute the CQI based, at least in part, on the determined QoS;
   wherein the determination logic is configured to compute a plurality of candidate CQIs based, at least in part, on a plurality of QoSs provided in the request; and
   wherein the determination logic is configured to select one of the candidate CQIs based on a selection criterion that identifies an average of the plurality of QoSs.

8. The apparatus of claim 7, wherein a first wireless device and a second wireless device communicate over the wireless channel.

9. The apparatus of claim 7, wherein the determination logic is configured to:
compute a plurality of candidate CQIs; and
select a CQI from the candidate CQIs.

10. The apparatus of claim 7, wherein the determination logic is configured to compute the CQI based, at least in part, on a QoS provided in the request.

11. The apparatus of claim 7, wherein the determination logic is further configured to report the computed CQI to a wireless device on the wireless channel.

12. The apparatus of claim 7, wherein the determination logic is configured to control, based on the computed CQI, a provisioning logic to perform provisioning.

13. The apparatus of claim 12 wherein the provisioning logic is configured to allocate resource blocks in a wireless device operating on the wireless channel.

14. A method of comprising:
receiving a request for a channel quality indicator (CQI);
observing a type of traffic on a wireless channel;
determining a quality of service (QoS) associated with the wireless channel on which to base the CQI, wherein the QoS is based, at least in part, on the traffic observed on the wireless channel; and
computing the CQI based, at least in part, on the determined QoS;
wherein computing a CQI comprises:
computing a plurality of candidate CQIs based, at least in part, on a plurality of QoSs provided in the request; and
selecting one of the candidate CQIs based on a selection criterion that identifies an average of the plurality of QoSs.

15. The method of claim 14, wherein determining the QoS comprises:
identifying two or more QoSs associated with two or more types of traffic observed on the wireless channel; and
selecting a member of the two or more QoSs that is the most stringent of the two or more QoSs.

16. A method, comprising:
observing traffic between a mobile station and base station communicating on a wireless channel;
identifying a quality of service (QoS) associated with the observed traffic, wherein identifying the QoS comprises:
identifying two or more QoSs associated with two or more types of traffic observed on the wireless channel; and
selecting a member of the two or more QoSs that is the most stringent of the two or more QoSs; and
computing a channel quality indicator (CQI) based, at least in part, on the selected QoS.

17. The method of claim 16, further comprising:
reconfiguring a provisioning between the mobile station and the base station based, at least in part, on the computed CQI.

18. The method of claim 17, wherein reconfiguring the provisioning comprises reallocating resource blocks.

19. The method of claim 17, wherein reconfiguring the provisioning comprises updating a transmission mode.

20. The method of claim 16, wherein computing the CQI comprises computing a finite alphabet capacity based, at least in part, on QoS constraints.

* * * * *